(12) United States Patent
Mead et al.

(10) Patent No.: US 11,526,390 B2
(45) Date of Patent: Dec. 13, 2022

(54) SYSTEM AND METHOD FOR MISSION CRITICAL SCREEN VALIDATION ON COMMERCIAL DISPLAYS

(71) Applicant: HONEYWELL INTERNATIONAL INC., Charlotte, NC (US)

(72) Inventors: Steven Mead, Bradenton, FL (US); Richard Berckefeldt, Paola, KS (US); Willard R. True, Kirkland, WA (US); Lu Cheng, Shanghai (CN); Kalluri Sarma, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 219 days.

(21) Appl. No.: 17/103,029

(22) Filed: Nov. 24, 2020

(65) Prior Publication Data

US 2022/0164247 A1    May 26, 2022

(51) Int. Cl.
*G06F 11/07* (2006.01)
*G06F 3/14* (2006.01)
(Continued)

(52) U.S. Cl.
CPC .......... *G06F 11/0739* (2013.01); *G06F 3/147* (2013.01); *G06F 3/1415* (2013.01);
(Continued)

(58) Field of Classification Search
CPC .... G06F 21/84; G06F 11/0739; G06F 3/1415; G06F 3/147; G01C 23/00; G06T 1/0021;
(Continued)

(56) References Cited

U.S. PATENT DOCUMENTS 6,523,114 B1  2/2003  Barton
9,189,827 B2  11/2015  Woo et al.
(Continued)

FOREIGN PATENT DOCUMENTS

DE    102015002973 B4 *  9/2020  ............. B60K 35/00
WO    WO-2019099835 A1 *  5/2019  ......... G02B 27/0101

OTHER PUBLICATIONS

Karen Bailey et al: "An Evaluation of Image Based Steganography Methods", Multimedia Tools and Applications, Kluwer Academic Publishers, BO, vol. 30, No. 1, Jun. 1, 2006 (Jun. 1, 2006), pp. 55-88, XP019404152, ISSN: 1573-7721, DOI: 10.1007/S11042-006-0008-4.

*Primary Examiner* — Vinh T Lam
(74) *Attorney, Agent, or Firm* — Lorenz & Kopf, LLP

(57) ABSTRACT

A method for verifying the integrity, continuity, and availability (ICA) of information displayed on an uncertified display is disclosed. The method includes creating application data for display on the uncertified display device that includes a subliminal symbol that is periodically embedded in a few out of multiple tens of frames and that is camouflaged in the application data using steganography; transmitting the application data to the uncertified display device for display; receiving images of the application data displayed on the display screen; determining whether the subliminal symbol is detected in the captured images by extracting the symbol from the captured images and comparing the extracted symbol to an expected symbol; determining that the application data is not corrupted when the extracted symbol matches the expected symbol; and identifying a loss of ICA when the subliminal symbol is not detected or does not match the expected symbol.

20 Claims, 10 Drawing Sheets

(51) Int. Cl.
*G06F 3/147* (2006.01)
*G06N 3/04* (2006.01)
*G06T 1/00* (2006.01)
*G09G 5/00* (2006.01)

(52) U.S. Cl.
CPC ............ *G06N 3/04* (2013.01); *G06T 1/0085* (2013.01); *G09G 5/006* (2013.01); *G09G 2358/00* (2013.01)

(58) Field of Classification Search
CPC ........... G06T 1/0085; G06T 2201/0081; G06T 2201/0051; G09G 5/006; G09G 2360/145; G09G 2370/04; G09G 2370/02; G09G 2358/00; G09G 2330/12; G09G 2380/12; G06N 3/04; G08G 5/0021
See application file for complete search history.

(56) References Cited

U.S. PATENT DOCUMENTS

| | | | |
|---|---|---|---|
| 9,292,859 | B1 | 3/2016 | Sivertsen |
| 10,268,334 | B2 | 4/2019 | Owczarski et al. |
| 10,273,020 | B1* | 4/2019 | Berckefeldt ............ G06F 3/147 |
| 10,298,718 | B1 | 5/2019 | Redmond |
| 10,338,337 | B1 | 7/2019 | Berckefeldt et al. |
| 10,636,390 | B2 | 4/2020 | Sarma et al. |
| 10,810,808 | B2* | 10/2020 | True ...................... B64D 43/00 |
| 11,001,143 | B2* | 5/2021 | Gulati .................. H03M 13/09 |
| 11,131,987 | B2* | 9/2021 | Wang ........................ G06T 7/90 |
| 2019/0177157 | A1 | 6/2019 | Sarma et al. |
| 2019/0179585 | A1* | 6/2019 | True ...................... G01C 23/00 |
| 2019/0180530 | A1 | 6/2019 | True et al. |
| 2019/0286115 | A1* | 9/2019 | Wang ...................... G06T 7/001 |
| 2020/0065044 | A1* | 2/2020 | True ....................... G01C 23/00 |

* cited by examiner

SYSTEM AND METHOD FOR MISSION CRITICAL SCREEN VALIDATION ON COMMERCIAL DISPLAYS

TECHNICAL FIELD

The present disclosure generally relates to display systems, and more particularly relates to display systems for displaying critical information on uncertified displays.

BACKGROUND

In many safety critical and/or regulated industries, such as avionics, maritime, rail, medical devices, nuclear, and others, display systems that display mission critical information may need to be certified that they can provide adequate integrity, continuity, and availability (ICA) for the mission critical information to be displayed thereon. The certification process may be costly and time-consuming and, therefore, may deter the implementation of new applications, such as new applications that use personal electronic devices (PEDs) to display mission critical information.

In the avionics industry, low-cost PEDs, such as tablet computers, are being used for non-critical applications, such as charts and maps applications and weight and balance calculators. Operators may also want to have the freedom to display aeronautical information, such as airport moving maps, air traffic (Cockpit Display of Traffic Information or CDTI), advanced weather radar information, and others, on tablet computers instead of having to make costly modifications and upgrades to their existing avionics displays. Long-standing regulatory policy prohibits the use of uncertified displays as the primary display of critical aeronautical information during flight because adequate integrity, continuity, and availability (ICA) cannot be assured.

Accordingly, it is desirable to provide a certifiable system for displaying critical information on uncertified displays or displays not approved for the display of data requiring high ICA. Furthermore, other desirable features and characteristics will become apparent from the subsequent detailed description, taken in conjunction with the accompanying drawings and the foregoing technical field and background.

SUMMARY

Systems and method are provided for allowing the use of uncertified displays to display mission critical information. In one embodiment, a system for verifying the integrity, continuity, and availability (ICA) of information displayed on an uncertified display is disclosed. The system includes a server that is certified to generate mission critical data for display; an adapter device configured to house an uncertified display device that provides the uncertified display; and a screen capture system configured to capture an image displayed on the uncertified display; wherein the system is configured to: create, on the server, application data for display on the uncertified display device that includes a subliminal symbol that is periodically embedded in a few out of multiple tens of frames (e.g., 2 out of every 120 frames) and that is camouflaged in the application data using steganography; transmit the application data to the uncertified display device for display; capture, using the screen capture system, images of the application data displayed on the display screen of the uncertified display device that includes the subliminal symbol that is camouflaged using steganography; transmit the captured images to the server; determine, at the server, whether the subliminal symbol is detected in the captured images of the application data by extracting, at the server, the symbol from the captured images and comparing the extracted symbol to an expected symbol; determine that the application data is not corrupted when the extracted symbol matches the expected symbol; identify a loss of ICA when the subliminal symbol is not detected in the application data displayed on the uncertified display device or does not match the expected symbol; and transmit an error indicator, from the server to the adapter device, when a loss of ICA is identified.

In another embodiment, a processor-implemented method in a high integrity device for verifying the integrity, continuity, and availability (ICA) of information displayed on an uncertified display is disclosed. The method includes creating, on the high integrity device by a processor, application data for display on the uncertified display device that includes a subliminal symbol that is periodically embedded in a few out of multiple tens of frames (e.g., 2 out of every 120 frames) and that is camouflaged in the application data using steganography; transmitting the application data to the uncertified display device for display; receiving, at the high integrity device from a screen capture system, images of the application data displayed on the display screen of the uncertified display device that includes the subliminal symbol that is camouflaged using steganography; determining, at the high integrity device, whether the subliminal symbol is detected in the captured images of the application data by extracting, at the server, the symbol from the captured images and comparing the extracted symbol to an expected symbol; determining that the application data is not corrupted when the extracted symbol matches the expected symbol; identifying a loss of ICA when the subliminal symbol is not detected in the application data displayed on the uncertified display device or does not match the expected symbol; and causing an annunciation indicating the loss of ICA when a loss of ICA is identified.

In another embodiment, a server that is certified to generate mission critical data is disclosed. The server is configured to: create application data for display on an uncertified display device that includes a subliminal symbol that is periodically embedded in a few out of multiple tens of frames (e.g., 2 out of every 120 frames) and that is camouflaged in the application data using steganography; transmit the application data to the uncertified display device for display; capture, using the screen capture system, images of the application data displayed on the display screen of the uncertified display device, wherein the symbol is not noticeable by the human eye, but discernable to the screen capture system; determine whether the subliminal symbol is detected in captured images of the application data displayed on the uncertified display device by extracting the symbol from the captured images and comparing the extracted symbol to an expected symbol, wherein the captured images were captured using a screen capture system that is configured to capture images of the application data displayed on the display screen of the uncertified display device that includes the subliminal symbol that is camouflaged using steganography; determine that the application data is not corrupted when the extracted symbol matches the expected symbol; identify a loss of ICA when the subliminal symbol is not detected in the application data displayed on the uncertified display device or does not match the expected symbol; and transmit an error indicator to the adapter device when a loss of ICA is identified.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
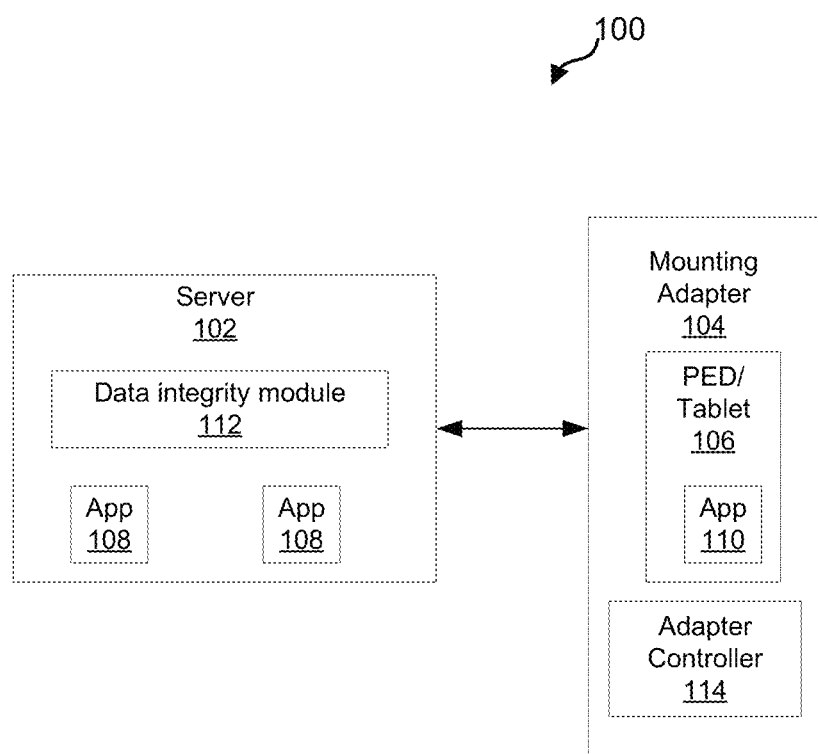
FIG. 1 is a block diagram depicting an example display system in an aircraft that allows uncertified display systems such as commercial PEDs/tablet computers to meet typical avionics requirements for the monitoring of ICA, in accordance with various embodiments.

The following detailed description is merely exemplary in nature and is not intended to limit the application and uses. References to aeronautical and/or aviation specific terms such as but not limited to "cockpit", "flight deck", "flight crew", "certification", or "aircraft" are for simplifying the description and are not intended to limit the application and uses to the aviation or aeronautical industry. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Apparatus, systems, methods, techniques and articles are described for providing assurance that an uncertified display, such as a display on a personal electronic device (PED) (e.g., a tablet computer or a smartphone), that is used to display mission critical data (e.g., critical aeronautical information) accurately conveys the mission critical data. The apparatus, systems, methods, techniques and articles described herein may provide assurances that an uncertified display accurately conveys mission critical data by verifying the integrity, continuity, and availability (ICA) of the mission critical data displayed on the uncertified display. Loss of accuracy or ICA can be annunciated to operators (e.g., a flight crew) of the uncertified display without reliance on the uncertified display to self-report the loss when displaying the mission critical data.

In the case of aeronautical applications, the apparatus, systems, methods, techniques and articles described herein may allow operators to use a PED to display aeronautical information. This may allow for a more affordable and quicker adoption of new avionics functionality. The described apparatus, systems, methods, techniques and articles may allow for mission critical data such as that generated by multiple high integrity applications (e.g. airborne situational awareness (AIRB) and various other CNS-ATM (Communications Navigation and Surveillance-Air Traffic Management) applications such as flight deck interval management (FIM) or air traffic control controller/pilot data link communication (CPDLC), SURF (Surface Surveillance application that includes an airport moving map with traffic superimposed), and others) to be displayed on uncertified displays. At the same time, the described apparatus, systems, methods, techniques and articles can allow data from lower integrity applications, such as maps and charts, to be displayed on the uncertified displays without changes to the applications or equipment installation.

In the following description, provided is an example implementation that addresses the particular problem of implementing application logic in an otherwise general-purpose input/output and computing device such that the integrity of the data sources, application code, and data outputs can be assured, while display and control functions can be implemented in systems that may not have the same level of integrity assurance.

A technical benefit of this approach is the ability to add high integrity applications to an aircraft that is already using low integrity devices (off-the-shelf tablets or other personal electronic devices) or would like to add these applications without the added cost of installing "installed avionics" (which has formerly been referred to as a class 3 EFB) or impacting the existing high integrity display and control systems.

FIG. 1 is a block diagram depicting an example system 100 that allows an uncertified display system, such as a PED, to meet typical avionics requirements for the monitoring of ICA. The example system 100 includes an application server 102 and a mounting adapter 104 configured to mount a PED 106 (having a PED display) in an aircraft flight deck or cockpit.

The example application server 102 includes at least one processor and a computer-readable storage device or media encoded with programming instructions for configuring the at least one processor. The example application server 102 is positioned in an aircraft. The example application server 102 is a fully certified avionics system that hosts and executes one or more high integrity avionics application modules 108. The high integrity avionics application modules 108 are configured to generate mission critical data (e.g., critical aeronautical information) for display on a cockpit display. The example application server 102 is configured to transmit the generated critical aeronautical information to an uncertified cockpit display (e.g., the PED 106) for display (e.g., on the PED display).

The example application server 102 also includes a data integrity module 112 that is configured to monitor the image displayed on an uncertified cockpit display when critical aeronautical information is transmitted from a high integrity avionics application module 108 to the uncertified cockpit display device (e.g., PED 106) to determine whether a problem exists with the display of the mission critical data on the uncertified display device. The example data integrity module 112 is configured to determine whether a problem exists with the display of the mission critical data on the uncertified display device 106 by verifying the integrity, continuity, and availability (ICA) of the mission critical data displayed on the uncertified display device 106. The example data integrity module 112 is also configured to cause an annunciation indicating that a problem exists with the display of mission critical data on the uncertified display device 106, when it determines that a problem indeed exists.

The mounting adapter 104 is configured to mount an uncertified display device 106 in an aircraft cockpit for use by a flight crew so that the uncertified display device 106 may display critical or non-critical aeronautical information to the flight crew. When the uncertified display device 106 comprises a tablet computer, the mounting adapter 104 may include a clamshell shape to fully enclose the tablet computer 106.

The example uncertified display device 106 may comprise a PED (such as a tablet computer or a smartphone), which includes at least one processor and computer readable media, and is configured to host and execute one or more application programs such as a specialized avionics display application 110. The example specialized avionics display application 110 is configured to display critical aeronautical information received by the PED 106 from the application server 102 and return finger, key, or mouse inputs for a high integrity avionics application module 108 to process.

The example mounting adapter 104 further includes an adapter controller 114. The example controller 114 includes at least one processor and computer readable media. The example controller 114 is configured (for example by programming instructions) to transmit images of the display on the uncertified display device 106 to the data integrity module 112 and to activate an annunciation indicating that a problem exists with the display of mission critical data on the uncertified display device 106, when the data integrity module 112 determines that a problem exists.

Figure 2:
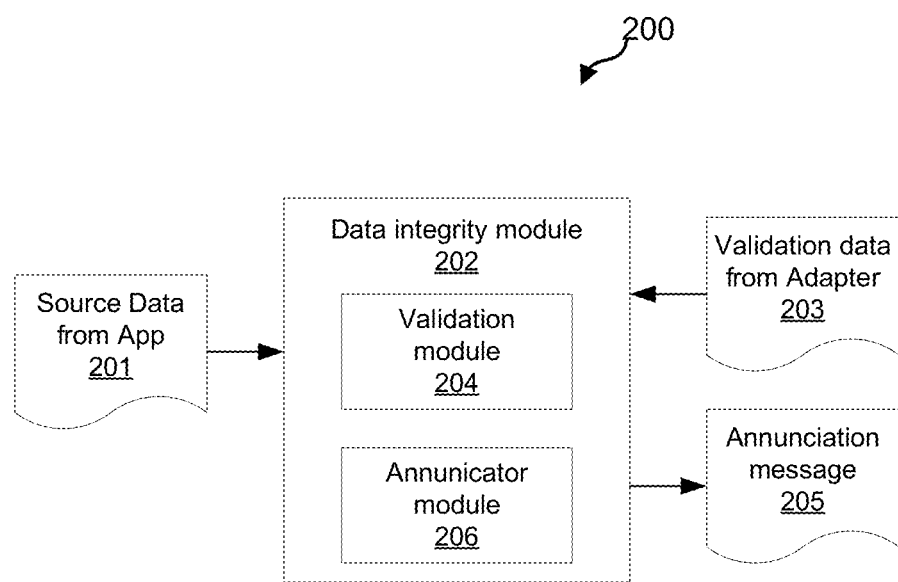
FIG. 2 is a block diagram depicting an example data integrity module in a server in an aircraft that allows the display of critical aeronautical information on an aircraft display that is not certified for displaying critical aeronautical information, in accordance with various embodiments.

FIG. 2 is a block diagram depicting an example data integrity module 202 in a server 200 wherein the example data integrity module provides a way to display critical aeronautical information on an aircraft display that is not certified for displaying critical aeronautical information. The example data integrity module 202 includes a validation module 204 and an annunciator module 206. All or parts of the example data integrity module 202 may be incorporated in an application module (e.g., application module 108 from FIG. 1) or separate from the application module.

The validation module 204 is configured to compare source data 201 (e.g., critical aeronautical information) received by the data integrity module 202 from a high integrity avionics application (e.g., high integrity avionics application module 108 from FIG. 1) to validation data 203 (which includes PED image information) received by the data integrity module 202 from a monitoring adapter (e.g., mounting adapter 104 from FIG. 1). The validation module 204 is configured to compare the source data 201 to the validation data 203 to determine whether a problem exists with the display of mission critical data on the uncertified display device (e.g., PED 106 from FIG. 1). The example validation module 204 is configured to determine whether a problem exists with the display of mission critical data on the uncertified display device (e.g., PED 106) by verifying the ICA of the mission critical data displayed on the uncertified display device (e.g., PED 106).

The annunciator module 206 is configured to communicate an annunciation 205 (e.g. a loss of ICA) to the mounting adapter (e.g., mounting adapter 104 from FIG. 1) that instructs the mounting adapter to annunciate a message indicating that a problem exists with the display of mission critical data on the uncertified display device, when the validation module 204 determines that a problem does exist with the display of the mission critical data.

Figure 3:
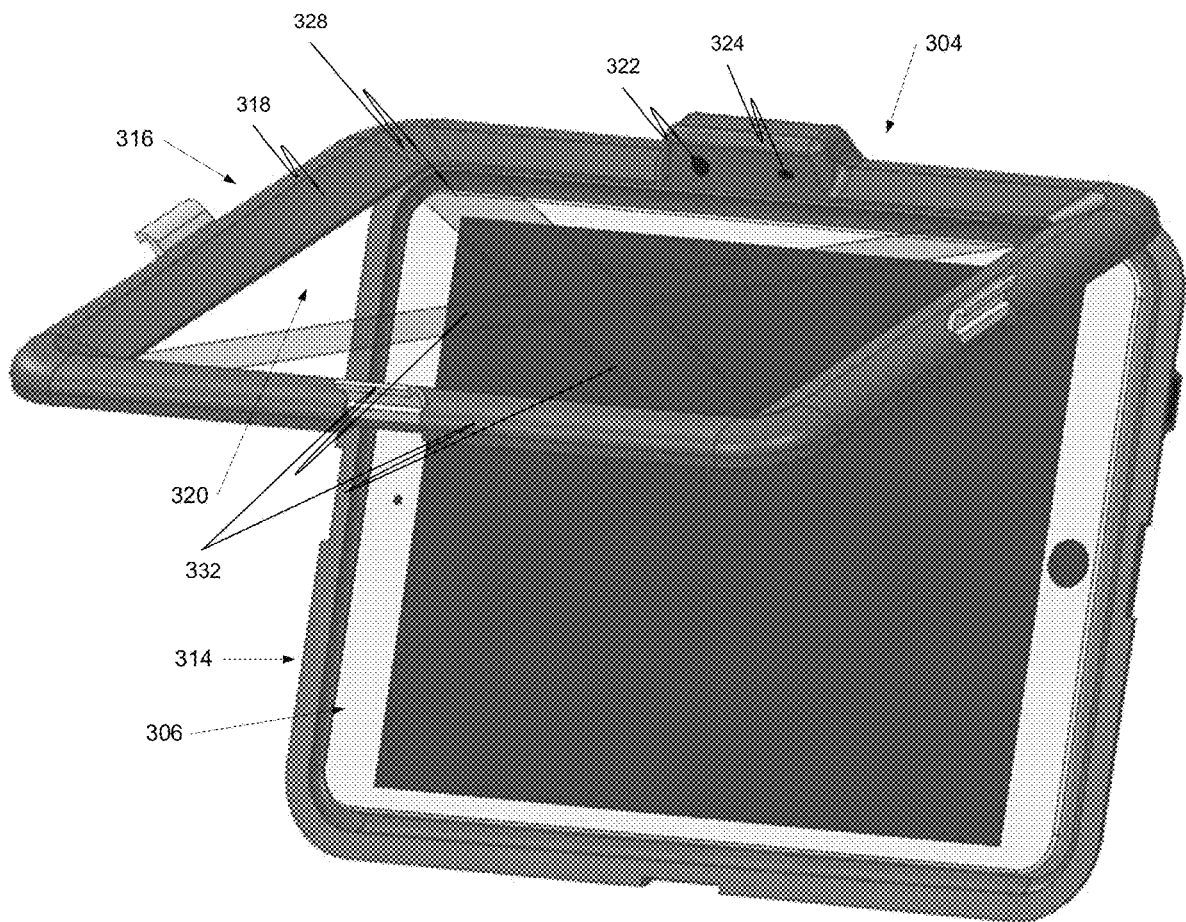
FIG. 3 is a block diagram illustrating an example PED mounting device, in accordance with various embodiments.

FIG. 3 is a block diagram depicting an example mounting adapter 304. The example mounting adapter 304 incorporates a clamshell design configured to mechanically capture a PED/tablet 306 and mount the mounting adapter 304 and PED 306 combination (i.e., the display assembly) in the aircraft flight deck or cockpit.

The example mounting adapter 304 includes a base or back 314 and a lid, cover, or front 316. The example base or back 314 is configured to be slightly larger than the outline of the tablet 306 to be mounted and may have threaded mounting bosses on the back to facilitate installation of the mounting adapter 304 in the aircraft. The example base 314 may also host multiple electrical wiring necessary to provide power and data exchange with the server 302.

The example mounting adapter 304 is also configured with a lid 316 that may be closed over the top of the tablet 306 to fully enclose the tablet 306 within the mounting adapter 304. The example lid 316 includes a bezel 318, a surface 320 (e.g., an optically and capacitively transparent film), an optical imaging device 322 (e.g., a camera), and an actuation source 324 (e.g., optically emissive devices).

The example bezel 318 is attached to the base 314 by hinges (not shown) or other mechanical means and closes around the tablet 306 to mechanically capture the tablet 306. The example bezel 318 also hosts the optically and capacitively transparent film 320, the optical imaging device 322, and the optically emissive devices 324.

The example optically and capacitively transparent film 320 is attached to the bezel 318 in a way that provides it physical contact with the tablet display when the lid 316 is closed to allow for normal touch-gesture control and display action of the tablet 306. Further, the example film 320 has special properties such as an actuatable covering 328 (e.g., a special coating) with applied or embedded nano-particles which are optically active in the presence of an excitation source such as electrical voltage or current or coincident optical or near-optical radiation (such as ultraviolet light). Upon application of the appropriate excitation signal, the coating 328 changes state from normally optically transparent to optically emissive or opaque in a way that is easily visible to an operator in multiple lighting conditions encountered on a flight deck.

An imaging device 322, such as a small camera (e.g., a camera similar to one that might be included in a smart phone), can be mounted or embedded on/in the bezel 318 of the lid 316 and aimed in a manner to provide for maximum view of the tablet display. More than one imaging device 322 may be used or a corrective lens (not shown) may be applied to compensate for the extremely oblique viewing angle the imaging device 322 may have with the tablet's display. The viewing angle of the imaging device(s) 322 may be enhanced or augmented by the use of lenses to optimize the image quality.

An actuation source 324, such as optically emissive devices (e.g., UV (ultra-violet) LEDs (light-emitting diodes)) may be located on the bezel and trained on the cover film 320 to illuminate the film's coating and activate its optical qualities. Other optically reactive technology, such as MEMS (Microelectromechanical systems) scanners and laser diodes, may alternatively be located on the bezel and trained on the cover film 320 to illuminate the film's coating and activate its optical qualities. Alternatively, if the actuatable covering 328 can be activated by an electrical signal, then the optically emissive devices 324, MEMS scanners, and laser diodes would not be needed in the bezel.

The example mounting adapter 304 further includes an adapter controller (not shown). The adapter controller is configured to transmit images from the display on the PED 306 to an application server (e.g., server 102 from FIG. 1), receive messages from the server indicating that a problem exists with the display of mission critical data on the tablet display (e.g. a loss of ICA), and cause the actuation source 324 to actuate the covering 328 to annunciate a message indicating that a problem exists with the display of mission critical data on the tablet display, when the server determines that a problem exists with the display of the mission critical data.

Figure 4:
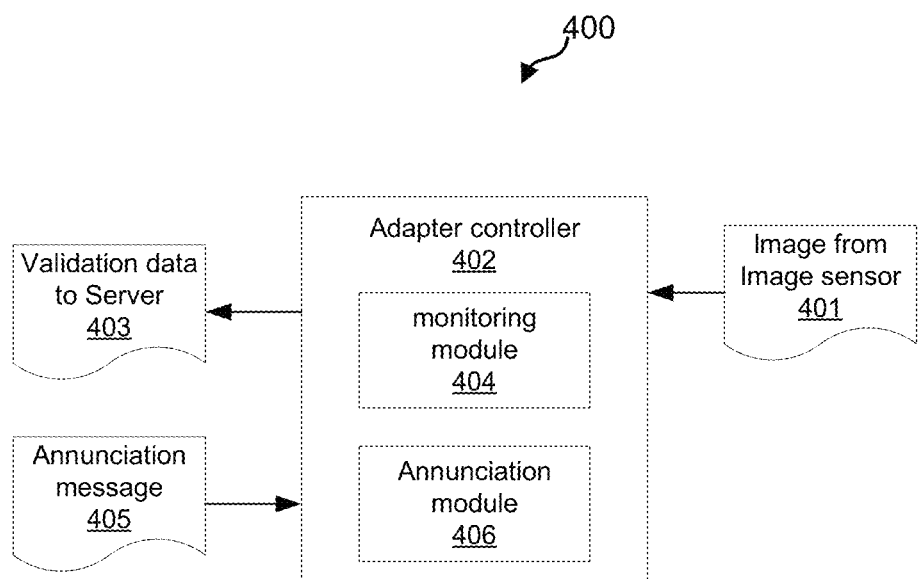
FIG. 4 is a block diagram depicting an example adapter controller in an adapter for allowing the display of critical aeronautical information on an aircraft display that is not certified for displaying critical aeronautical information, in accordance with various embodiments.

FIG. 4 is a block diagram depicting an example adapter controller 402 in a mounting adapter 400. The example adapter controller includes a monitoring module 404 and an annunciation module 406. The example adapter controller 402 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example monitoring module 404 is configured to retrieve an image 401 of the PED display from a screen capture by the PED (e.g., using an operating system screen capture feature) or an imaging sensor (e.g., imaging sensor from imaging device 322 from FIG. 3) and transmit validation data 403 (which includes image information from the PED display) to an application server (e.g., server 102 from FIG. 1). The example annunciation module 406 is configured to receive an annunciation 405 from the server indicating that a problem exists with the display of mission critical data on the PED display (e.g. a loss of ICA), and cause an actuation source (e.g., actuation source 324 from FIG. 3) to actuate the covering 328 to annunciate a message indicating that a problem exists with the display of mission critical data on the PED display, when the server determines that a problem exists with the display of the mission critical data.

Referring again to FIGS. 1 and 3, the example system 100 may function as follows. An avionics application 108 such as a CDTI may execute on the server 102 while an avionics display application 110 executes on the tablet 106 or 306. The tablet 106 or 306 is enclosed in the mounting adapter 104 or 304 which is mounted on the flight deck in a suitable location (e.g., on the outboard side of the crew's seats). The mounting adapter 104 or 304 may be connected to the remote server 102 by several bus wires, such as a bi-directional data bus which allows for information exchanges between the tablet 106 or 306 and the server 102 (and perhaps supplies power to the tablet), a bus to carry video information from the imaging device 322 to the remote server 102, and a signal or power bus from the remote server 102 to the actuation source 324. The mounting adapter 104 or 304 may be additionally differentiated from commercially available tablet cases in that it may be qualified for aviation use by providing mechanical and electrical protection for the tablet 106 or 306 and the aircraft by being qualified according to RTCA DO-160(x).

The example system 100 can allow uncertified display devices such as PEDs/tablets 106 or 306 to display critical aeronautical information by performing two functions: ICA monitoring and providing crew annunciation of non-nominal ICA status.

ICA monitoring may be accomplished in two layers as follows. The avionics application 108 executing on the server will determine what information/images need to be displayed on the tablet 106 and will encode (e.g., using tokenized OpenGL or HTML5) and transmit that information to the avionics display application 110 executing on the tablet 106 or 306. In the first layer, prior to displaying any of this information, the avionics display application 110 will decode the information to be displayed and re-encode it in a dis-similar protocol and "echo back" the information to the remote server 102, which will compare the echo-back information with the information originally sent. Matching information will result in an "ack" (acknowledgement) from the server to the tablet while a mismatch would generate a "no-ack" and a crew annunciation. This first layer provides for monitoring the ICA to the avionics display application 110 but does not provide for monitoring the link between the avionics display application 110 and the physical display.

In the second layer, the system may monitor the actual information displayed on the screen via a screen capture by the PED (e.g., using an operating system screen capture feature) or the image sensor 322 mounted on the bezel 318. As an example, monitoring may include monitoring all aspects of the display (color and location of every pixel) or using a sampling scheme where the probability of detecting loss of ICA is equivalent or better to the requirements of the Hazard Classification of the application. Thus, the monitoring rigor can be tailored to the criticality of the application. Sampling schemes could be further simplified by using specific patterns like QR codes which are displayed for a few milliseconds on the display and may be customized for optimal recognizability by the image sensor 322 (e.g., a keystone shape). The codes could be randomly changed in content, location, and timing to add robustness to the sampling scheme. In any case, the optical information imaged by the image sensor 322 is sent back to the server 102 to enable the software application 108 to compare the image detected to what it expected to see based on what it sent to the PED 106 or 306 for display. If a loss of ICA is detected, the server 102/application 108 would activate the appropriate annunciation.

If the server 102/application 108 determines that there has been a loss of ICA, it can activate an annunciation by asserting the appropriate electrical signal on the output bus to activate the coating on the cover film 320 of the tablet mounting adapter 104. As an example, the annunciation might simply put a red 'X' 332 over the display if a failure was detected. An 'X' character could be coated onto the cover film 320. Other more sophisticated (but fixed) imagery or text could (also or alternatively) be coated onto the cover film including one or more textual failure messages. In addition, a fail-condition may also result in the sending of display information to an alternate location such as a different tablet.

Annunciation may be accomplished as follows. The film 320 and coating 328 provides the overall system with the ability to annunciate fixed or variable information to the crew as encoded in the coating 328 or other optically reactive elements. Signal inputs from the server 102 may be used to activate the optical coating 328. The activation may be electrical, similar to the way an LCD is activated, by the application of a voltage across the breadth of the coating.

The activation may also be accomplished by illuminating the coating with a selective bandwidth of emitted light. In this example, light emitting elements such as discrete LEDs may be designed into the bezel of the lid and aimed toward the coating on the film. The LEDs would be energized by a signal or signals from the server and would then illuminate the coating in a flood pattern. The coating would be activated by the illumination provided by the LEDs and would change state to be clearly visible to the crew. The spectrum of light required to activate the coating would be selected to use light not typically found on flight decks either from natural or artificial light to avoid un-commanded activation of the coating.

An alternate implementation may use illumination devices such as laser diodes where the laser light is directed to specifically intended locations by means of providing coordinates from the server to a MEMS Scanner which would direct the excitation light to those intended locations on the cover film. This technique may employ a stroke or raster scan pattern which allows characters or images to be displayed on the cover film.

Figure 5:
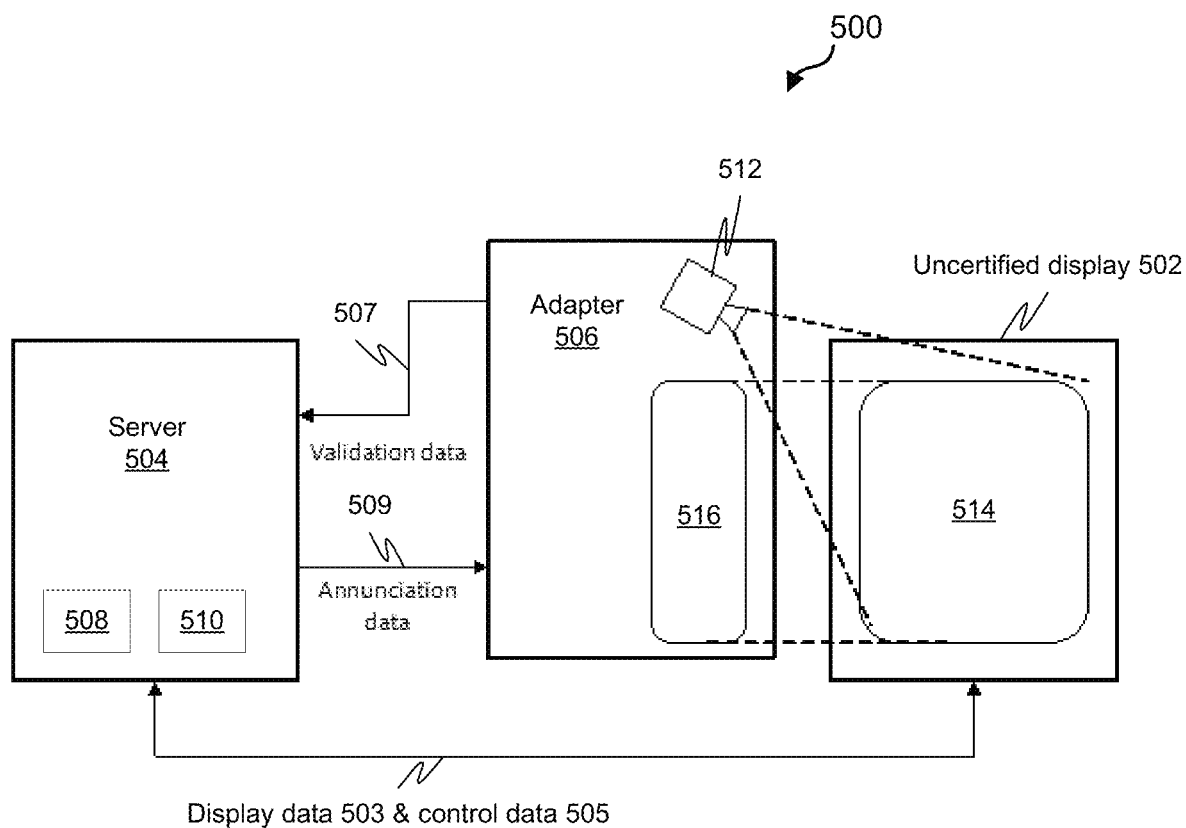
FIG. 5 is a block diagram depicting an example system that supports the use of high integrity applications on uncertified display and control devices, in accordance with various embodiments.

FIG. 5 is a block diagram depicting an example system 500 that supports the use of high integrity applications on uncertified display and control devices. The example system 500 is configured to verify the integrity, continuity, and availability (ICA) of information displayed to and/or entered by flight crew on a low integrity and/or uncertified display device 502. The example system 500 is configured to allow a low integrity device, such as a commercial off-the-shelf PED or tablet computer, to work with high integrity applications.

The example system 500 includes a server 504 that is certified as a high integrity device and an adapter device 506 that may also be certified as a high integrity device. The example server 504 includes one or more processors configured by programming instructions on computer readable media, one or more application modules 508 configured to generate high integrity data for display, and verification logic 510 configured to validate information displayed on the uncertified display device 502 and cause an annunciation indicating a loss of ICA when a loss of ICA is detected. The example adapter device 506 is configured with an optical sensing device 512 (e.g., a camera, photo sensor, and others) trained on the display screen 514 of the uncertified display device 502 and configured to capture an image displayed on the display screen 514. The example adapter device 506 is further configured with an annunciation screen 516 configured to overlay the display screen 514 of the uncertified display device 502 and annunciate a message indicating a loss of ICA when a loss of ICA is detected.

The example system 500 is configured to create, on the high integrity server 504 using one or more application modules 508, application data 503 for display on the uncertified display device 502; transmit the application data 503 to the uncertified display device 502 for display; and retrieve control data 505 entered by flight crew using the uncertified display device 502. The example system 500 is further configured to capture, e.g., using the optical sensing device 512, an image of the display screen 514 of the uncertified display device 502; transfer, to the validation logic 510 (e.g., from the optical sensing device 512), the captured image of the display as validation data 507; determine, at the high integrity server 504, an expected display image to be displayed on the uncertified display device 502; compare, at the high integrity server 504 using the verification logic 510, the captured image of the display to the expected display image; and identify, at the high integrity server 504 using the verification logic 510, a loss of ICA when one or more frames in the captured image fails the comparison with the expected display image. The example system 500 is additionally configured to transmit annunciation data 509, from the server 504 to the adapter 506, indicating the loss of ICA when the loss of ICA is identified. The adapter 506, via the annunciation screen 516, is configured to cause an annunciation indicating the loss of ICA upon receipt of the annunciation data 509.

The example system 500 is configured with one or more verification protocols that allow the system 502, via the verification logic 510, to determine if a loss of ICA has occurred with the uncertified display device 502. The verification logic 510 is configured to compute a characteristic of the display that is known to change as the display data is updated, and then examine an image of the display to verify that the display is showing the correct current data.

Although some failures with a display may be detectable by a human user, such as a completely blank display, a reversed display (due for example to installation error) or other obvious faults, there are other faults that may not be easily detected by a user such as a frozen display, unexpectedly long latency in the display, looping or playing back of stale data, or the display of the wrong colors (e.g. a traffic symbol that should be highlighted in amber being shown in the non-highlighted white). It may also be difficult or impossible for a user to determine if a malicious entity has suppressed valid display data or injected invalid display data.

The example system 500 is configured to detect faults that a human user might notice as well as faults that a human user might not detect. In the first case (faults detectable by a user), the example system may detect failures more quickly than a user to facilitate automatic switchover to back up systems to improve continuity and/or to inform maintenance systems to improve availability. In the second case (faults not easily detected by a user) the example system can detect failures to provide higher integrity.

Figure 6:
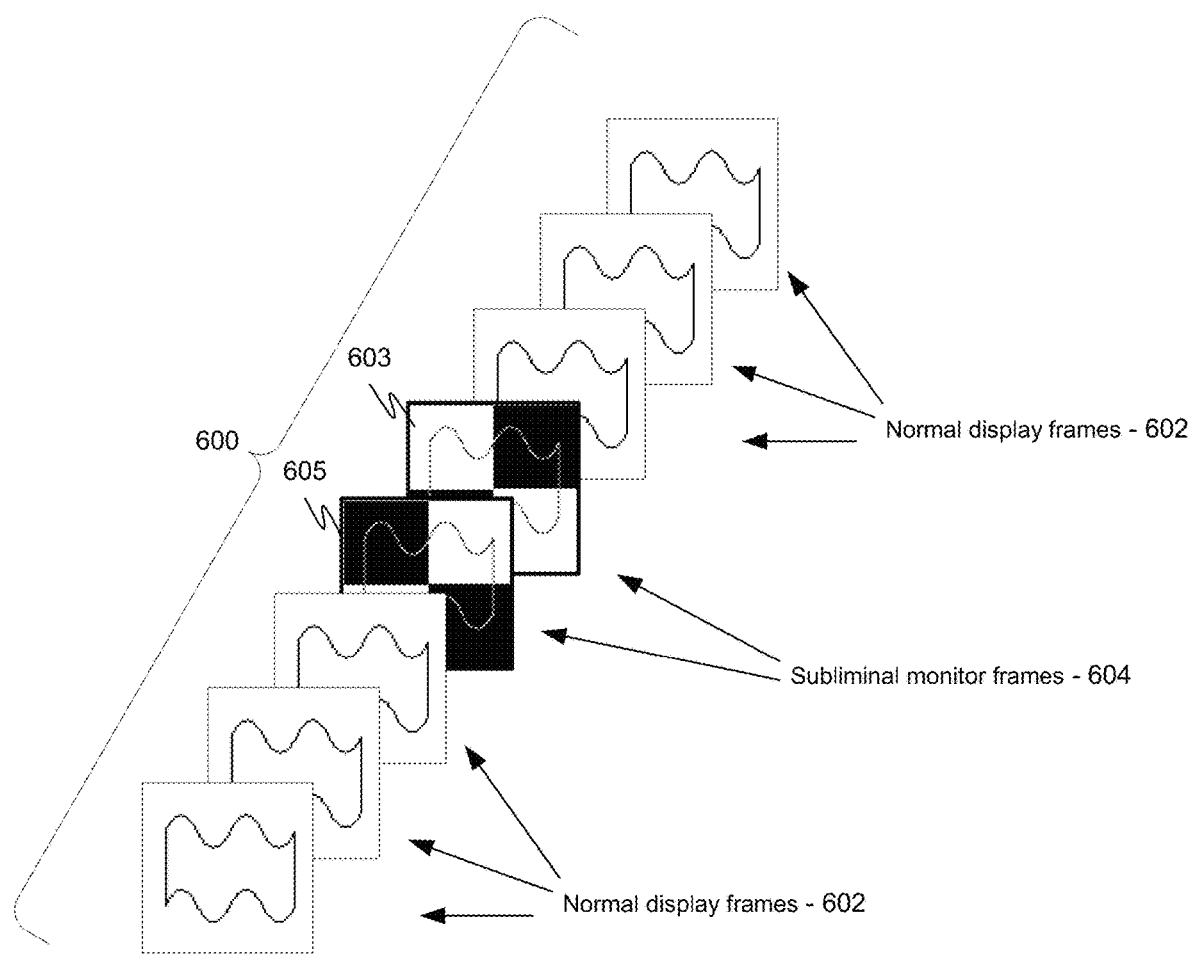
FIG. 6 is a diagram depicting an example stream of frames to be displayed on an uncertified display device, in accordance with various embodiments.

One example verification protocol used in the example system 500 may involve the use of embedded monitoring frames. With this example verification protocol, special display frames are created and periodically embedded in the display data. FIG. 6 is a diagram depicting an example stream of frames 600 to be displayed on an uncertified display device (such as display device 502). The example stream of frames 600 includes normal display frames 602 and example monitoring frames 604 interleaved in the stream of frames 600 with the normal display frames 602. The example monitoring frames 604 are constructed to be easily recognizable by the sensing system (e.g., optical sensing device 512) in the adapter (e.g., adapter 506) but not visible, or at least minimally distracting, to a human user. The example monitoring frames 604 may be made subliminal, for example, by only displaying them for a very short time, by displaying them with reduced brightness or contrast, or by displaying them in a color selected to be detectable by the sensing system but not noticeable by a human user.

The rate of injected monitoring frames (i.e., monitoring frame rate) can be adjusted to meet the capabilities of the hardware and the level of verification needed. For example, for a medium integrity application that may update frames at a 60 Hz rate, the server 504 could insert a monitoring frame once per second (e.g., one out of every 60 frames such that a one second stream of frames includes 59 frames of normal display frames and one monitoring frame), and the uncertified display device 502 could be declared inoperative if one or more frames are missed or found to be non-identical to the frames sent by the server 504. For example, the uncertified display device 502 could be declared inoperative if three monitoring frames are missed or found to be non-identical to the frames sent by the server. Requiring multiple monitoring frame failures could add mitigation for inadvertent operator-induced monitoring frame failures, such as those caused by optical monitor obstructions due to data entry or other temporary/transient loss of optical monitoring. In this example scenario, the uncertified display device 502 could not be in a failure state for more than 4 seconds without detection. The failure detection time may be reduced or lengthened, respectively, by increasing or decreasing the monitoring frame rate or, respectively, by reducing or increasing the number of allowed missed frames.

The monitoring frames (e.g., monitoring frames 604) may be designed to be easily recognizable by the sensing system (e.g., optical sensing device 512), with alternating light regions 603 and dark regions 605. The shape, luminance and color of light regions 603 and dark regions 605 can be tailored for the specific display and sensor technology used, as well as the physical layout of the sensing system, including optical device sensitivity and field of view and the requirements of the application (e.g., application module 508) for the degree of integrity desired. Further, the monitoring frames can be configured to not interfere with the display of information intended for the human user, for example, by selecting a monitoring frame rate that results in the monitoring frames being displayed too briefly for human recognition, by displaying the monitoring frames with reduced contrast or luminance, or by some combination of these techniques.

In one refinement to the first verification protocol, the monitoring frames could be constructed to include coding information in addition to information used simply for recognition. The monitoring frames could be adapted to include coding information in the monitoring frames, such as a hash or CRC of incoming data to the display device 502 and/or outgoing data from the display device 502. The coding information to the display device 502 could be verified by the display device 502 and the coding information from the display device 502 could be verified by the high integrity server 504. This refinement to the first verification protocol can be used to provide an additional check on the processing and display functions of the low integrity display device 502.

In a second refinement to the first verification protocol, a time synchronization check could be implemented by encoding a time-based signal as part of coding information included in the monitoring frames. In this example, if the time-based signal does not change as expected (e.g., increment or decrement) in an image of the display from the display device 502, the server 504 may determine that a problem exists with the display device 502.

Features of the monitoring frames (e.g., monitoring frames 604), such as the shape, luminance, color or pattern, may vary periodically to allow a stuck or looping display on a display device (e.g., display device 502) to be detected by a server 504. An example varying of monitoring frame features is illustrated in FIG. 6. In this example, the light and dark patterns are reversed in the two monitoring frames. If the server 504, in this example, does not detect the varying light and dark pattern from one monitoring frame to another, the server 504 may determine that the display device 502 has a looping or stuck display. Other feature variations in the monitoring frames may be used as well. Additionally, the embedded monitoring frame may be configured to cover a portion and not the entire display.

In another refinement to the first verification protocol, the monitoring frames could be configured to display content in one region of the total display, and the sensor system (e.g., optical device 512) could be configured to look for monitoring frames in that region. The location of the region could be fixed or could vary with time. For example, the display may include 10 regions and each successive monitoring frame could be located in a different one of the 10 regions. In this example scenario, monitoring frame verification may occur after 10 scans, through confirming that the monitoring frame had been located in each of the 10 regions.

A second example verification protocol that may be used in the example system 500 is directed to an image verification method. An example image verification method involves the capturing of the actual display contents on the display device (e.g., display device 502) using a screen capture function associated with the PED (e.g., using an operating system screen capture feature) or an optical sensing device (e.g., optical sensing device 512) and comparing the captured image with an expected image. The example image verification method includes determining the design parameters appropriate for the hardware in the example system 500 and the application integrity requirements. The design parameters may include selecting: one of complete image verification or critical field verification; the verification rate; and optical sensing device calibration.

Regarding the complete image verification versus critical field design parameter, for information generated by some user applications, it may be desired that the complete display image is verified. For information generated by other user application, only critical fields of the display may need to be verified. For example, with a traffic display application it may be important that the entire display be verified because the traffic information can appear in any location or orientation of the display. However, with a speed control application where the critical speed commands may be displayed in a fixed location on the display, continuously verifying the portion of the display that provides the command information may suffice.

If the design choice is to verify one or more critical fields, the physical design and layout of the adapter (e.g., camera position and orientation) may be adapted for critical field verification. Additionally, or alternatively, critical field verification may be accomplished in an image processing step using fixed or configurable image masks. Critical fields in an avionics application may include, but are not limited to, items such as ATC messages (with a communication application), speed commands (with a traffic management application), and caution and warning messages (with an aircraft monitoring application).

Regarding the image verification rate design parameter, the image verification rate can be selected based on user application integrity requirements. For applications that require failures to be detected and annunciated very rapidly, the image verification can be performed at a high rate, potentially up to verifying every frame sent to the display. For applications that can tolerate some delay between the occurrence of a fault and its detection, the rate could be lowered to reduce the processing and communications requirements on the system. The verification can also be limited to some fraction of the display on each scan, with a sequence of scans required to verify the entire display.

Regarding the optical sensing device calibration design parameter, for standard geometric image verification, it may be important that the optical sensing device (e.g., optical sensing device 512, such as one or more cameras, or an imaging sensor such as a photo sensor) accurately captures the expected image. The optical sensing device calibration design parameter may involve corrections for geometric distortions due to the angle of the optical sensing device to the display on which the optical sensing device is trained and for different optical sensing technologies that may be used (e.g., camera, photo sensor, and others). One approach to geometric distortion correction may involve orienting an optical sensing device as nearly perpendicularly to the image to be verified as possible and applying optical sensing device calibration techniques such as one involving using a suitable geometric transformation between the expected display and the sensed image. Finding a suitable transformation between the expected display and the sensed image may be a required design choice for the application. A transformation may be needed when optical sensing devices such as cameras, which may capture an image of the display, or a photo sensor, which may monitor varying brightness of the display in the performance of a "liveness" check of the display, are used as the optical sensing device. Another approach to geometric distortion correction may include the use of optical lenses designed to compensate for known distortions in the imagery due to oblique viewing angles. If the design choice is to verify one or more critical fields, geometric distortion correction may only be needed for the critical fields.

Figure 7:
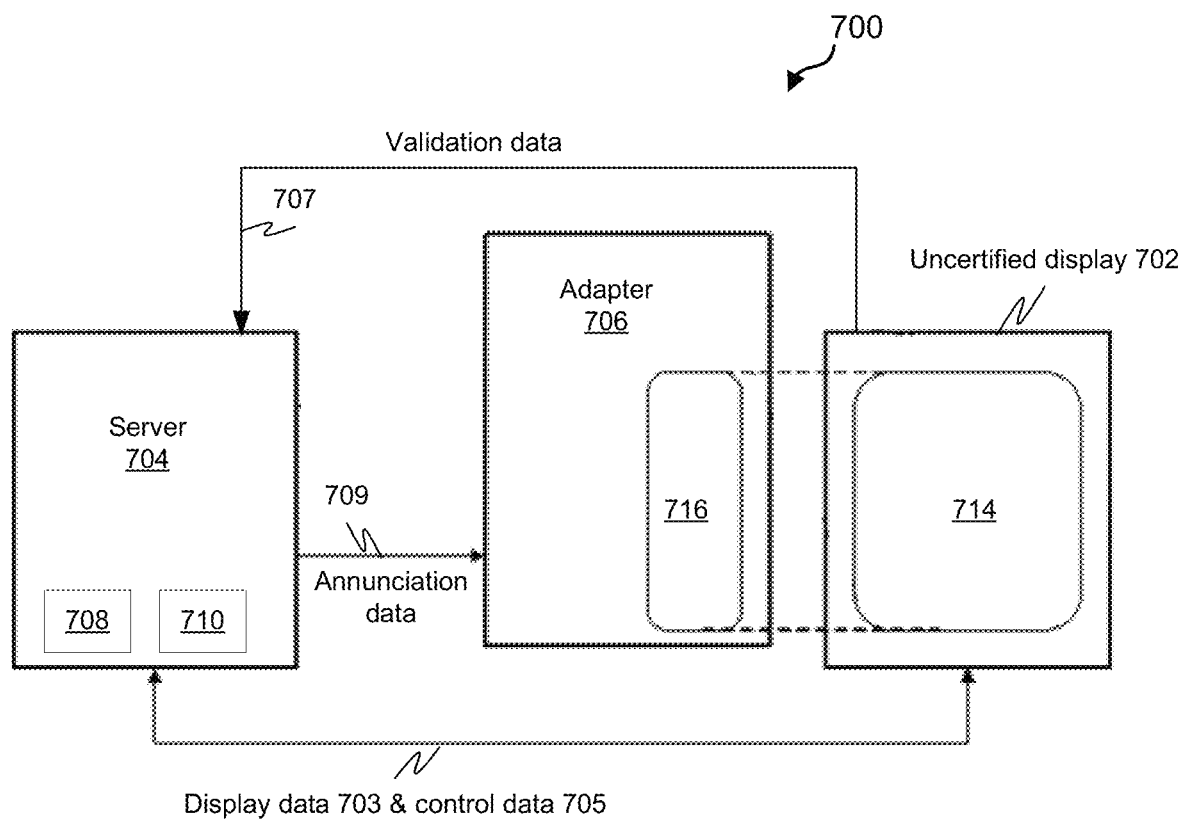
FIG. 7 is a block diagram depicting another example system that supports the use of high integrity applications on uncertified display and control devices, in accordance with various embodiments.

FIG. 7 is a block diagram depicting an example system 700 that supports the use of high integrity applications on uncertified display and control devices. The example system 700 is configured to verify the integrity, continuity, and availability (ICA) of information displayed to and/or entered by flight crew on a low integrity and/or uncertified display device 702. The example system 700 is configured to allow a low integrity device, such as a commercial off-the-shelf PED or tablet computer, to work with high integrity applications.

The example system 700 includes a server 704 that is certified as a high integrity device and an adapter device 706 that may also be certified as a high integrity device. The example server 704 includes one or more processors configured by programming instructions on computer readable media, one or more application modules 708 configured to generate high integrity data for display, and verification logic 710 configured to validate information displayed on the uncertified display device 702 and cause an annunciation indicating a loss of ICA when a loss of ICA is detected. Instead of using an optical sensing device (e.g., optical sensing device 512) trained on the display screen 714 of the uncertified display device 702 to capture an image displayed on the display screen 714, the example system 700 generates the captured image using operating system support from the low integrity device (for example a screen capture or snapshot function). The example adapter device 706 is further configured with an annunciation screen 716 configured to overlay the display screen 714 of the uncertified display device 702 and annunciate a loss of ICA when a loss of ICA is detected.

The example system 700 is configured to create, on the high integrity server 704 using one or more application modules 708, application data 703 for display on the uncertified display device 702; transmit the application data 703 to the uncertified display device 702 for display; and retrieve control data 705 entered by flight crew using the uncertified display device 702. The example system 700 is further configured to capture, using operating system support from the low integrity device (for example a screen capture or snapshot function), an image of the display screen 714 of the uncertified display device 702; transfer, to the validation logic 710 (e.g., from the low integrity device 702), the captured image of the display as validation data 707; determine, at the high integrity server 704, an expected display image to be displayed on the uncertified display device 702; compare, at the high integrity server 704 using the verification logic 710, the captured image of the display to the expected display image; and identify, at the high integrity server 704 using the verification logic 710, a loss of ICA when one or more frames in the captured image fails the comparison with the expected display image. The example system 700 is additionally configured to transmit annunciation data 709, from the server 704 to the adapter 706, indicating the loss of ICA when the loss of ICA is identified. The adapter 706, via the annunciation screen 716, is configured to cause an annunciation indicating the loss of ICA upon receipt of the annunciation data 709.

The example system 700 is configured with one or more verification protocols that allow the system 702, via the verification logic 710, to determine if a loss of ICA has occurred with the uncertified display device 702. The verification logic 710 is configured to compute a characteristic of the display that is known to change as the display data is updated, and then examine an image of the display to verify that the display is showing the correct current data.

Although some failures with a display may be detectable by a human user, such as a completely blank display, a reversed display (due for example to installation error) or other obvious faults, there are other faults that may not be easily detected by a user such as a frozen display, unexpectedly long latency in the display, looping or playing back of stale data, or the display of the wrong colors (e.g. a traffic symbol that should be highlighted in amber being shown in the non-highlighted white). It may also be difficult or impossible for a user to determine if a malicious entity has suppressed valid display data or injected invalid display data.

The example system 700 is configured to detect faults that a human user might notice as well as faults that a human user might not detect. In the first case (faults detectable by a user), the example system may detect failures more quickly than a user to facilitate automatic switchover to back up systems to improve continuity and/or to inform maintenance systems to improve availability. In the second case (faults not easily detected by a user) the example system can detect failures to provide higher integrity.

An example verification protocol that may be used in the example system 500 and/or example system 700 involves the generation of a machine testable screen which is made through a combination of subliminal and steganographic techniques to be undetectable to the pilot (e.g., to not interfere with flight use). With this example verification protocol, an optical code is created and periodically embedded in a layer under a screen graphics in a color shade only slightly different from the color of the background of the screen. The optical code may, for example, be a linear or one-dimensional (1D) barcode such as a Universal Product Code (UPC) barcode. The optical code, for example, may be a two-dimensional (2D) optical code (e.g., matrix code, 2D barcode, or QR code) that uses rectangles, dots, hexagons and other geometric patterns to represent data regarding the aircraft alert message in a visual, machine-readable form. Some other form of optical code may also be used. The optical code is embedded using both subliminal and steganographic techniques to hide the optical code in plain sight, wherein subliminality relates to the ability to display something faster than a human can see but a video capture device (e.g., camera or screen grab operating system feature) capable of fast frame rates can capture and steganography relates to the ability to display something camouflaged such that a human cannot see it without knowing where/how to look for deviation such as taking advantage of human perception to integrate rapid color changes within a range of colors.

Figure 8A:
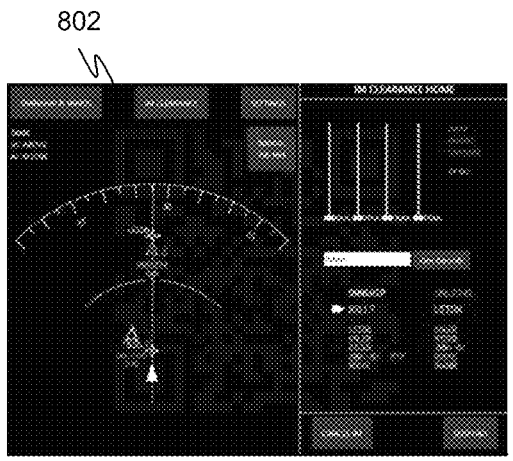
FIG. 8A is a diagram depicting an example data frame to be displayed on an uncertified device, in accordance with various embodiments.
Figure 8B:
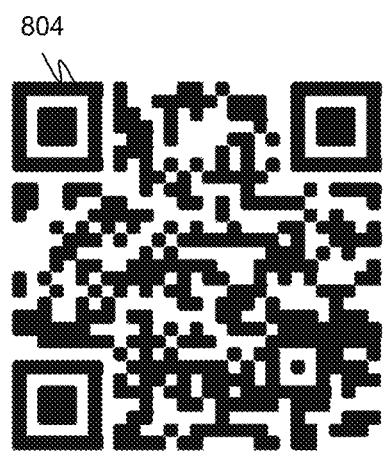
FIG. 8B is a diagram depicting an example optical code to be embedded in frames using both subliminal and steganographic techniques to hide the optical code in plain sight, in accordance with various embodiments.
Figure 8C:
FIG. 8C is a diagram depicting an example data frame displayed on an uncertified device that includes an optical code 808 embedded in the example data frame using both subliminal and steganographic (e.g., complementary color) techniques to hide the optical code in plain sight, in accordance with various embodiments.

FIG. 8A is a diagram depicting an example data frame 802 to be displayed on an uncertified device (e.g., PED 502 or 702). FIG. 8B is a diagram depicting an example optical code 804 to be embedded in frames using both subliminal and steganographic techniques to hide the optical code in plain sight. FIG. 8C is a diagram depicting an example data frame 806 displayed on an uncertified device (e.g., PED 502 or 702) that includes an optical code 808 (e.g., same as optical code 804) embedded in the example data frame 806 using both subliminal and steganographic techniques to hide the optical code in plain sight.

An example stream of frames displayed on the uncertified device may include normal display frames 802 and example monitoring frames 806 interleaved in the stream of frames with the normal display frames 802. The example monitoring frames 806 are constructed to contain am optical code 808 that can be easily recognizable by the sensing system (e.g., optical sensing device 512 or operating system screen capture feature) but not visible, or at least minimally distracting, to a human user. The example optical code 808 can be made subliminal, for example, by only displaying it for a very short time periodically embedded in a few out of multiple tens of frames (e.g., 2 out of every 120 frames may be a monitoring frame 806 containing an optical code 808) of application data having a frame rate of multiple tens of frames per second (e.g., 120 Hz or greater), wherein the optical code 808 is displayed at a rate that reduces the ability of a human to see the optical code 808 but at a rate that is not too fast for the screen capture system (e.g., a camera) capable of fast frame rates to capture the optical code 808. The example optical code 808 can be hidden in the example monitoring frames 806 in plain sight using steganography, for example, using two-frame contrasting color steganography. Although this example shows the use of two-frame steganography, other multi-frame steganography techniques may be employed such as three-frame steganography and others.

Using two-frame contrasting color steganography, the optical code 808 can be camouflaged in two consecutively displayed monitoring frames 806 by taking advantage of the ability of human eyes to integrate two mathematically selected colors to produce a desired color. With two-frame contrasting color steganography, the color for a desired vector drawing command can be converted to an HSV (or other perceptual) color space and two vector commands implemented. In one of two consecutively displayed monitoring frames 808, the color of the optical code 806 can be changed to have a hue of no more than 15 degrees less than a desired color (e.g., background color in the normal display frames 802). In the second of the two monitoring frames 808, the color of the optical code 806 can be changed to have a hue with the same delta degrees added to the desired color. When the two monitoring frames 808 are shown back to back, the human eye will integrate the two hues to create the desired color (e.g., background color in the normal display frames 802) for the optical code 806 to hide the optical codes

806 in plain sight. The screen capture system, however, should be able to capture the optical codes 806 in the two monitoring frames 808.

When a black color is used for the optical code 806, in one of two consecutively displayed monitoring frames 808, the color of the optical code 806 can be displayed in black and in the second of the two monitoring frames 808, the color of the optical code 806 can be changed to add a blue offset of not more than 40 out of 255. Because the human eye is less sensitive to the color blue, using this color offset scheme may allow the optical code 806 to hide in plain sight.

When a white color is used for the optical code 806, in one of two consecutively displayed monitoring frames 808, the color of the optical code 806 can be displayed in white and in the second of the two monitoring frames 808, the color of the optical code 806 can be changed to subtract a blue offset, for example, a blue offset of not more than 40 out of 255. Because the human eye is less sensitive to rapid changes in the color blue, using this color offset scheme may allow the optical code 806 to hide in plain sight.

The size of the example optical code 808 may be adjusted to increase or decrease the perceptibility of the optical code 808. For example, the example optical code 808 may be sized to take up the entire size of a frame 806 or sized to occupy a small portion of the frame 806. Also, the location of the example optical code 808 may be moved around to reduce perceptibility.

Figure 9:
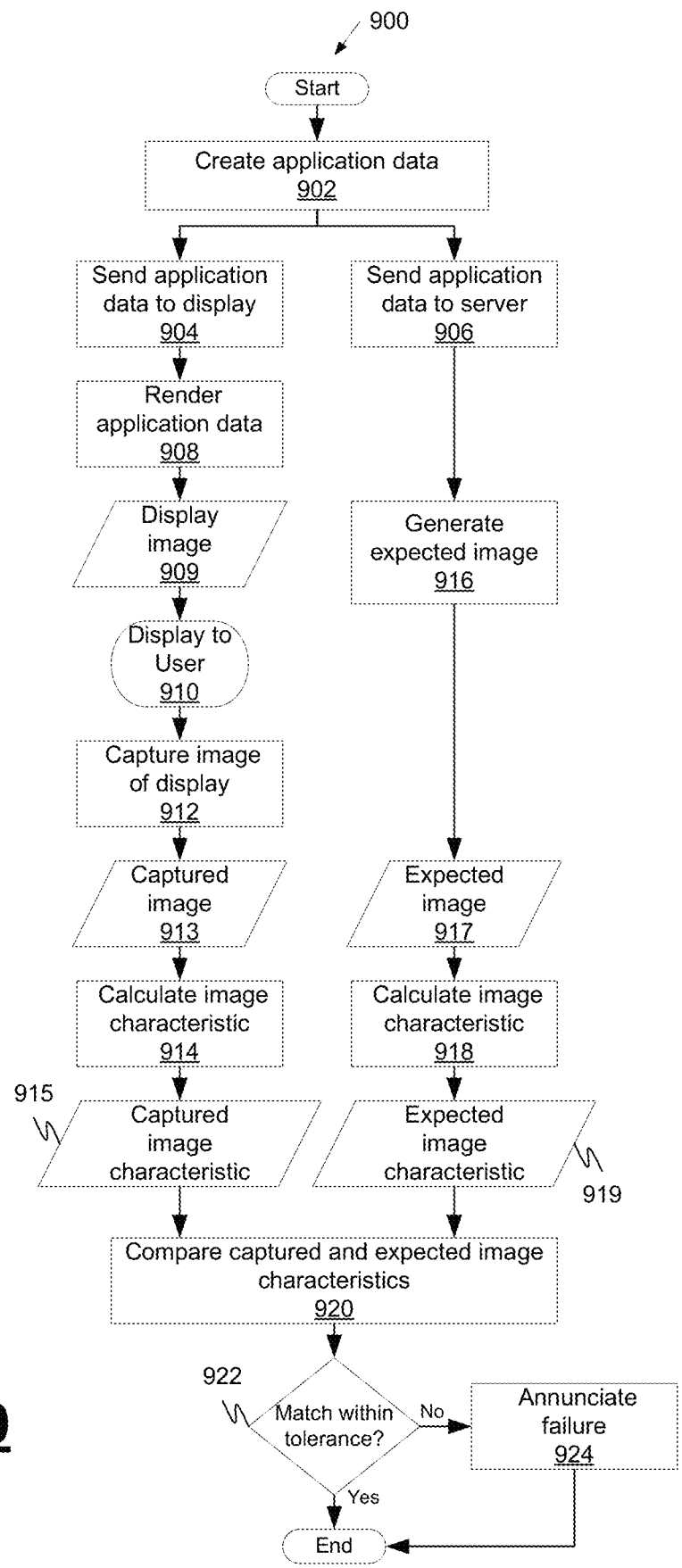
FIG. 9 is a process flow chart depicting an example process of performing integrity verification on a real-time basis using an example system that supports the use of high integrity applications on uncertified display and control devices, in accordance with various embodiments.

FIG. 9 is a process flow chart depicting an example process 900 of performing integrity verification on a real-time basis using an example system that supports the use of high integrity applications on uncertified display and control devices. The example process 900 includes creating application data (operation 902). The application data can be created by a high integrity application executing on a high integrity server. The example process 900 further includes sending the application data to a display device (operation 904) and sending the application data to verification logic on the server (operation 906). The display device may be a low integrity or uncertified device. The application data is rendered (operation 908) to generate a display image 909 that is displayed to a user (operation 910) on the low integrity display device. The example process 900 includes capturing an image (913) of the display on the display device (operation 912) and sending the captured image to the server. The captured image (913) may be captured using an optical sensor such as a camera associated with an adapter or a screen capture or screen grab function associated with the display device.

The example process 900 further includes generating an expected image (917) at the server from the application data (operation 916). The example process includes calculating one or more image characteristics 915 from the captured image 913 (operation 914) at the server and calculating one or more image characteristics 919 from the expected image characteristic 917 (operation 918) at the server. The captured image characteristic 915 and the expected image characteristic 919 are compared (operation 920) at the server.

A determination is made regarding whether a match exists, within tolerances, between the captured image characteristic 915 and the expected image characteristic 917 (decision 922). If the match is within tolerances (yes at decision 922), then processing of that frame ends. If the match is not within tolerances (no at decision 922), then the failure is caused to be annunciated (operation 924). Then processing of that frame ends.

As illustrated in FIG. 9, much of the operations may be performed using the high integrity server. The application logic would be executed and the data necessary to create the display would be created on a server with integrity commensurate with the application integrity requirements. The display data would then be transmitted to the low integrity device where the image would be rendered and displayed to the user. The adapter would then capture an image of what is displayed to the user. In parallel, the server would render a representation of what is expected on the user display (this representation could be an exact replica of the display, or could only include key features such as the presence of a monitoring frame, the overall brightness, color, spatial frequency content of the display, etc.). The captured image and expected image would then be compared by the server. The images are compared by computing some characteristic of the two images and checking that the characteristics match.

In the event the expected image and the captured image do not match within some defined tolerance, the server would then determine whether a sufficient failure state exists (in the case of an integrity monitoring design requiring multiple mismatches to occur before a failure is declared) to send an annunciation to the adapter, and the adapter would indicate to the user that the low integrity device had failed.

Annunciation (operation 924) may not be the only action taken when a failure is detected. Because, in this example, the application logic is performed on the system implementing the verification, the fault information can be fed back to the application and appropriate mitigation actions (such as switching to a backup system and/or informing a higher-level monitoring function of the fault) can be taken.

There are a number of options available for calculating the image characteristics (operations 914 and 918) and for comparing the captured and expected image characteristics (operation 920). One example approach for comparing images involves aligning the captured and expected images as closely as possible, performing a difference function over the pixels in the two images, and deriving a similarity measure. The similarity measure may be used to detect errors in the displayed image that could either mean the display is unavailable (continuity or availability faults) or that some critical element is providing false or misleading information (integrity faults).

A second example approach involves histogram calculations wherein histograms are calculated for each of the captured image and the expected image, and the two histograms are compared. One advantage of this approach is that it may not require precise alignment between the two images. A third example approach involves a spatial frequency calculation wherein a Fourier transform histogram is calculated for each of the captured image and the expected image, and the two histograms are compared. An advantage of this approach is that it may not require precise alignment between the two images.

A fourth example approach involves the use of an artificial neural network (ANN). Because the adapter may have an extremely non-linear transformation that may be difficult or impossible to calculate analytically, the image characteristics may be calculated by an ANN trained on the particular display and image capture device. The ANN could be trained under controlled circumstances to distinguish valid displays and faulted displays and could generate a signal indicating a fault when a faulted display is detected.

Figure 10:
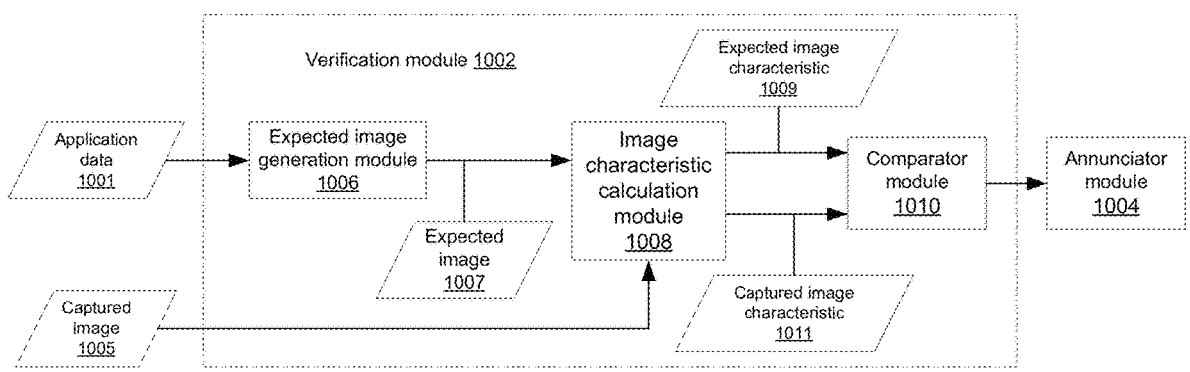
FIG. 10 is a block diagram depicting example components of an example verification module in a server that supports the use of high integrity applications on uncertified display and control devices, in accordance with various embodiments.

FIG. 10 is a block diagram depicting example components of an example verification module 1002 in a server that supports the use of high integrity applications on uncertified display and control devices. The example verification module 1002 is configured to verify the ICA of data displayed on a low integrity device and cause an annunciator module 1004 to communicate an error message if a loss of ICA is detected. The example verification module 1002 includes an expected image generation module 1006, an image characteristic calculation module 1008, and a comparator module 1010.

The example expected image generation module 1006 is configured to receive application data 1001 from a high integrity application and generate an expected image 1007 from the application data. The application data may be the same information sent to the low integrity device for display.

The example image characteristic calculation module 1008 is configured to calculate an image characteristic for both the expected image 1007 and a captured image 1005, wherein the captured image 1005 includes an image of the display on the low integrity device. The captured image may have been captured from an imaging device trained on the display on the low integrity device or from a screen capture or screen grab function associated with the low integrity device. The example image characteristic calculation module 1008 may be configured to calculate a similarity measure between the expected image 1007 and the captured image 1005, calculate histograms for each of the captured image and the expected image, calculate a Fourier transform histogram for each of the captured image and the expected image, or implement an ANN to calculate image characteristics. An expected image characteristic 1009 and a captured image characteristic 1011 may be output from the example image characteristic calculation module 1008.

The example comparator module 1010 is configured to compare the expected image characteristic 1009 and the captured image characteristic 1011. If the match between the expected image characteristic 1009 and the captured image characteristic 1011 is not within acceptable tolerances, the example comparator module 1010 is configured to output an indicator to an annunciator module 1004 directing the annunciator module 1004 to cause an annunciation indicating that a problem exists with the display of data on the low integrity device.

Apparatus, systems, methods, techniques and articles are described for providing assurance that an uncertified or low integrity display that is used to display mission critical data accurately conveys the mission critical data. The apparatus, systems, methods, techniques and articles described herein may provide assurances that an uncertified display accurately conveys mission critical data by verifying the integrity, continuity, and availability (ICA) of the mission critical data displayed on the uncertified display. The apparatus, systems, methods, techniques and articles described herein may provide a method of validating that a carry-on tablet is displaying what is being commanded of it (by certified software/hardware), wherein displayed is something that is not perceptible or barely perceptible to the flight crew, but that can be captured by a screen capture system and sent to server for validation of the data displayed on the uncertified display.

In one embodiment, a system for verifying the integrity, continuity, and availability (ICA) of information displayed on an uncertified display is provided. The system comprises a server that is certified to generate mission critical data for display; an adapter device configured to house an uncertified display device that provides the uncertified display; and a screen capture system configured to capture an image displayed on the uncertified display; wherein the system is configured to: create, on the server, application data (which may include a user interface) for display on the uncertified display device that includes a subliminal symbol that is periodically embedded in a few out of multiple tens of frames (e.g., 2 out of every 120 frames) and that is camouflaged in the application data using steganography (e.g., two-frame steganography or other multi-frame steganography techniques); transmit the application data to the uncertified display device for display; capture, using the screen capture system, images of the application data displayed on the display screen of the uncertified display device that includes the subliminal symbol that is camouflaged using two-frame steganography; transmit the captured images to the server; determine, at the server, whether the subliminal symbol is detected in the captured images of the application data by extracting, at the server, the symbol from the captured images and comparing the extracted symbol to an expected symbol; determine that the application data is not corrupted when the extracted symbol matches the expected symbol; identify a loss of ICA when the subliminal symbol is not detected in the application data displayed on the uncertified display device or does not match the expected symbol; and transmit an error indicator, from the server to the adapter device, when a loss of ICA is identified.

These aspects and other embodiments may include one or more of the following features. The screen capture system may be configured to take a digital screen grab of the image displayed on the uncertified display (e.g., from the screen buffer of the uncertified display). The screen capture system may comprise an optical sensing device (e.g., a camera) capable of taking a picture of the image displayed on the uncertified display. The application data may have a frame rate of multiple tens of frames per second (e.g., 120 Hz or greater). The subliminal symbol may be camouflaged in the application data using two-frame contrasting color steganography for non-greyscale colors. The subliminal symbol may be camouflaged in the application data using blue color addition or subtraction for greyscale colors. The system may be further configured to display on an annunciation screen an annunciation indicating a loss of ICA or cause the display screen of the uncertified display device to be disabled when a loss of ICA is identified. The comparing the extracted symbol to an expected symbol may comprise one or more of: calculating an image characteristic for both the extracted symbol and the expected symbol; calculating a similarity measure between the extracted symbol and the expected symbol; calculating histograms for each of the extracted symbol and the expected symbol; and implementing an artificial neural network (ANN) to calculate image characteristics. The features of the subliminal symbol may be varied from one set of steganography frames to another. The loss of ICA may be identified when the subliminal symbol is not detected in the application data in multiple frames or multiple instances of the subliminal symbol does not match the expected symbol.

In another embodiment, a processor-implemented method in a high integrity device for verifying the integrity, continuity, and availability (ICA) of information displayed on an uncertified display is provided. The method comprises creating, on the high integrity device by a processor, application data (which may include a user interface) for display on the uncertified display device that includes a subliminal symbol that is periodically embedded in a few out of multiple tens of frames (e.g., 2 out of every 120 frames) and that is camouflaged in the application data using steganography (e.g., two-frame steganography or other multi-frame steganography techniques); transmitting the application data to the uncertified display device for display; receiving, at the high integrity device from a screen capture system, images of the application data displayed on the display screen of the uncertified display device that includes the subliminal symbol that is camouflaged using two-frame steganography; determining, at the high integrity device, whether the subliminal symbol is detected in the captured images of the application data by extracting, at the server, the symbol from the captured images and comparing the extracted symbol to an expected symbol; determining that the application data is not corrupted when the extracted symbol matches the expected symbol; identifying a loss of ICA when the subliminal symbol is not detected in the application data displayed on the uncertified display device or does not match the expected symbol; and causing an annunciation indicating the loss of ICA or disabling the display screen of the uncertified display device when a loss of ICA is identified.

These aspects and other embodiments may include one or more of the following features. The screen capture system may be configured to take a digital screen grab of the image displayed on the uncertified display. The screen capture system may comprise an optical sensing device (e.g., a camera) capable of taking a picture of the image displayed on the uncertified display. The application data may have a frame rate of multiple tens of frames per second (e.g., 120 Hz or greater). The subliminal symbol may be camouflaged in the application data using two-frame contrasting color steganography for non-greyscale colors. The subliminal symbol may be camouflaged in the application data using blue color addition or subtraction for greyscale colors. The comparing the extracted symbol to an expected symbol may comprise one or more of: calculating an image characteristic for both the extracted symbol and the expected symbol; calculating a similarity measure between the extracted symbol and the expected symbol; calculating histograms for each of the extracted symbol and the expected symbol; and implementing an artificial neural network (ANN) to calculate image characteristics. The features of the subliminal symbol may be varied from one set of steganography frames to another. A loss of ICA may be identified when the subliminal symbol is not detected in the application data in multiple frames or multiple instances of the subliminal symbol does not match the expected symbol.

In another embodiment, a server that is certified to generate mission critical data is provided. The server is configured to: create application data (which may include a user interface) for display on an uncertified display device that includes a subliminal symbol that is periodically embedded in a few out of multiple tens of frames (e.g., 2 out of every 120 frames) and that is camouflaged in the application data using steganography (e.g., two-frame steganography or other multi-frame steganography techniques); transmit the application data to the uncertified display device for display; receive, from a screen capture system, images of the application data displayed on the display screen of the uncertified display device that includes the subliminal symbol that is camouflaged using two-frame steganography; determine whether the subliminal symbol is detected in captured images of the application data displayed on the uncertified display device by extracting the symbol from the captured images and comparing the extracted symbol to an expected symbol; determine that the application data is not corrupted when the extracted symbol matches the expected symbol; identify a loss of ICA when the subliminal symbol is not detected in the application data displayed on the uncertified display device or does not match the expected symbol; and transmit an error indicator when a loss of ICA is identified.

These aspects and other embodiments may include one or more of the following features. The screen capture system may be configured to take a digital screen grab of the image displayed on the uncertified display. The screen capture system may comprise an optical sensing device (e.g., a camera) capable of taking a picture of the image displayed on the uncertified display. The application data may have a frame rate of multiple tens of frames per second (e.g., 120 Hz or greater). The subliminal symbol may be camouflaged in the application data using two-frame contrasting color steganography for non-greyscale colors. The subliminal symbol may be camouflaged in the application data using blue color addition or subtraction for greyscale colors. The comparing the extracted symbol to an expected symbol may comprise one or more of: calculating an image characteristic for both the extracted symbol and the expected symbol; calculating a similarity measure between the extracted symbol and the expected symbol; calculating histograms for each of the extracted symbol and the expected symbol; and implementing an artificial neural network (ANN) to calculate image characteristics. The features of the subliminal symbol may be varied from one set of steganography frames to another. A loss of ICA may be identified when the subliminal symbol is not detected in the application data in multiple frames or multiple instances of the subliminal symbol does not match the expected symbol.

In another embodiment, a system for verifying the integrity, continuity, and availability (ICA) of information displayed on an uncertified display is provided. The system comprises: a server that is certified to generate mission critical data, the server comprising one or more processors configured by programming instructions on computer readable media and an application module configured to generate mission critical data for display; an adapter device configured to house an uncertified display device that provides the uncertified display; and a screen capture system configured to capture an image displayed on the uncertified display, wherein the screen capture system is configured to take a digital screen grab of the image displayed on the uncertified display and/or comprises an optical sensing device (e.g., a camera) capable of taking a picture of the image displayed on the uncertified display; wherein the system is configured to: create, on the server, application data (which may include a user interface) for display on the uncertified display device, the application data including a subliminal symbol that is periodically embedded in a few out of multiple tens of frames (e.g., 2 out of every 120 frames) of application data having a frame rate of multiple tens of frames per second (e.g., 120 Hz or greater), wherein the subliminal symbol is displayed at a rate that reduces the ability of a human to see the subliminal symbol but at a rate that is not too fast for the screen capture system (e.g., a camera) capable of fast frame rates to capture the subliminal symbol, wherein the subliminal symbol is camouflaged in the application data using two-frame contrasting color steganography for non-greyscale colors and blue color addition or subtraction for greyscale colors to camouflage the subliminal symbol using steganography; transmit the application data to the uncertified display device for display; capture, using the screen capture system, an image of the application data displayed on the display screen of the uncertified display device, wherein the symbol is not noticeable by the human eye, but discernable to a camera; transmit the captured image to the server; determine, at the server, whether the subliminal symbol is detected in the captured image of the application data displayed on the uncertified display device by extracting, at the server, the symbol from the captured frame and comparing the extracted symbol to an expected symbol; determine that the application data is not corrupted when the extracted symbol matches the expected symbol; identify a loss of ICA when the subliminal symbol is not detected in the application data displayed on the uncertified display device or does not match the expected symbol; and transmit an error indicator, from the server to the adapter device, when a loss of ICA is identified.

In another embodiment, a processor-implemented method in a high integrity device for verifying the integrity, continuity, and availability (ICA) of information displayed on an uncertified display is provided. The method comprises: creating, on the high integrity device by a processor, application data (which may include a user interface) for display on the uncertified display device, the application data including a subliminal symbol that is periodically embedded in a few out of multiple tens of frames (e.g., 2 out of every 120 frames) of application data having a frame rate of multiple tens of frames per second (e.g., 120 Hz or greater), wherein the subliminal symbol is displayed at a rate that reduces the ability of a human to see the subliminal symbol but at a rate that is not too fast for the screen capture system (e.g., a camera) capable of fast frame rates to capture the subliminal symbol, wherein the subliminal symbol is camouflaged in the application data using two-frame contrasting color steganography for non-greyscale colors and blue color addition or subtraction for greyscale colors to camouflage the subliminal symbol using steganography; transmitting the application data to the uncertified display device for display; receiving, at the high integrity device from a screen capture system, an image of the application data displayed on the display screen of the uncertified display device, wherein the symbol is not noticeable by the human eye, but discernable to the screen capture system; determining, at the high integrity device, whether the subliminal symbol is detected in the captured image of the application data displayed on the uncertified display device by extracting, at the server, the symbol from the captured frame and comparing the extracted symbol to an expected symbol; determining that the application data is not corrupted when the extracted symbol matches the expected symbol; identifying a loss of ICA when the subliminal symbol is not detected in the application data displayed on the uncertified display device or does not match the expected symbol; and causing an annunciation indicating the loss of ICA when a loss of ICA is identified.

In another embodiment, a server that is certified to generate mission critical data is provided. The server comprises one or more processors configured by programming instructions on computer readable media and an application module configured to generate mission critical data for display. The server is configured to: create application data (which may include a user interface) for display on the uncertified display device, the application data including a subliminal symbol that is periodically embedded in a few out of multiple tens of frames (e.g., 2 out of every 120 frames) of application data having a frame rate of multiple tens of frames per second (e.g., 120 Hz or greater), wherein the subliminal symbol is displayed at a rate that reduces the ability of a human to see the subliminal symbol but at a rate that is not too fast for the screen capture system (e.g., a camera) capable of fast frame rates to capture the subliminal symbol, wherein the subliminal symbol is camouflaged in the application data using two-frame contrasting color steganography for non-greyscale colors and blue color addition or subtraction for greyscale colors to camouflage the subliminal symbol using steganography; transmit the application data to the uncertified display device for display; receive captured images of the application data displayed on the display screen of the uncertified display device, wherein the symbol is not noticeable by the human eye, but discernable to screen capture system, wherein the images were captured using the screen capture system; determine, at the server, whether the subliminal symbol is detected in the captured images of the application data displayed on the uncertified display device by extracting, at the server, the symbol from the captured images and comparing the extracted symbol to an expected symbol; determine that the application data is not corrupted when the extracted symbol matches the expected symbol; identify a loss of ICA when the subliminal symbol is not detected in the application data displayed on the uncertified display device or does not match the expected symbol; and transmit an error indicator, from the server to the adapter device, when a loss of ICA is identified.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for verifying the integrity, continuity, and availability (ICA) of information displayed on an uncertified display, the system comprising:
a server that is certified to generate mission critical data for display;
an adapter device configured to house an uncertified display device that provides the uncertified display; and
a screen capture system configured to capture an image displayed on the uncertified display;
wherein the system is configured to:
create, on the server, application data for display on the uncertified display device that includes a subliminal symbol that is periodically embedded in a few out of multiple tens of frames and that is camouflaged in the application data using steganography;
transmit the application data to the uncertified display device for display;
capture, using the screen capture system, images of the application data displayed on the display screen of the uncertified display device that includes the subliminal symbol that is camouflaged using steganography;
transmit the captured images to the server;
determine, at the server, whether the subliminal symbol is detected in the captured images of the application data by extracting, at the server, the symbol from the captured images and comparing the extracted symbol to an expected symbol;
determine that the application data is not corrupted when the extracted symbol matches the expected symbol;
identify a loss of ICA when the subliminal symbol is not detected in the application data displayed on the uncertified display device or does not match the expected symbol; and
transmit an error indicator, from the server to the adapter device, when a loss of ICA is identified.

2. The system of claim 1, wherein the screen capture system is configured to take a digital screen grab of the image displayed on the uncertified display.

3. The system of claim 1, wherein the screen capture system comprises an optical sensing device capable of taking a picture of the image displayed on the uncertified display.

4. The system of claim 1, wherein the application data has a frame rate of multiple tens of frames per second.

5. The system of claim 1, wherein the subliminal symbol is camouflaged in the application data using two-frame contrasting color steganography for non-greyscale colors.

6. The system of claim 1, wherein the subliminal symbol is camouflaged in the application data using blue color addition or subtraction for greyscale colors.

7. The system of claim 1, further configured to display on an annunciation screen an annunciation indicating a loss of ICA or cause the display screen of the uncertified display device to be disabled when a loss of ICA is identified.

8. The system of claim 1, wherein the comparing the extracted symbol to an expected symbol comprises one or more of:
calculating an image characteristic for both the extracted symbol and the expected symbol;
calculating a similarity measure between the extracted symbol and the expected symbol;
calculating histograms for each of the extracted symbol and the expected symbol; and
implementing an artificial neural network (ANN) to calculate image characteristics.

9. The system of claim 1, wherein features of the subliminal symbol are varied from one set of steganography frames to another.

10. The system of claim 1, wherein a loss of ICA is identified when the subliminal symbol is not detected in the application data in multiple frames or multiple instances of the subliminal symbol does not match the expected symbol.

11. The system of claim 1, further configured to transmit the application data to an alternate display device and cease transmitting the application data to the uncertified display device when the loss of ICA is identified.

12. The system of claim 1, further configured to generate a maintenance message when the loss of ICA is identified.

13. A processor-implemented method in a high integrity device for verifying the integrity, continuity, and availability (ICA) of information displayed on an uncertified display, the method comprising:
creating, on the high integrity device by a processor, application data for display on the uncertified display device that includes a subliminal symbol that is periodically embedded in a few out of multiple tens of frames and that is camouflaged in the application data using steganography;

transmitting the application data to the uncertified display device for display;

receiving, at the high integrity device from a screen capture system, images of the application data displayed on the display screen of the uncertified display device that includes the subliminal symbol that is camouflaged using steganography;

determining, at the high integrity device, whether the subliminal symbol is detected in the captured images of the application data by extracting the symbol from the captured images and comparing the extracted symbol to an expected symbol;

determining that the application data is not corrupted when the extracted symbol matches the expected symbol;

identifying a loss of ICA when the subliminal symbol is not detected in the application data displayed on the uncertified display device or does not match the expected symbol; and causing an annunciation indicating the loss of ICA or disabling the display screen of the uncertified display device when a loss of ICA is identified.

14. The method of claim 13, wherein the application data has a frame rate of multiple tens of frames per second.

15. The method of claim 13, wherein the subliminal symbol is camouflaged in the application data using two-frame contrasting color steganography for non-greyscale colors.

16. The method of claim 13, wherein the subliminal symbol is camouflaged in the application data using blue color addition or subtraction for greyscale colors.

17. The method of claim 13, wherein the comparing the extracted symbol to an expected symbol comprises one or more of:

calculating an image characteristic for both the extracted symbol and the expected symbol;

calculating a similarity measure between the extracted symbol and the expected symbol;

calculating histograms for each of the extracted symbol and the expected symbol; and implementing an artificial neural network (ANN) to calculate image characteristics.

18. The method of claim 13, wherein features of the subliminal symbol are varied from one set of steganography frames to another.

19. The method of claim 13, wherein a loss of ICA is identified when the subliminal symbol is not detected in the application data in multiple frames or multiple instances of the subliminal symbol does not match the expected symbol.

20. A server that is certified to generate mission critical data, the server configured to:

create application data for display on an uncertified display device that includes a subliminal symbol that is periodically embedded in a few out of multiple tens of frames and that is camouflaged in the application data using steganography;

transmit the application data to the uncertified display device for display;

receive, from a screen capture system, images of the application data displayed on the display screen of the uncertified display device that includes the subliminal symbol that is camouflaged using steganography;

determine whether the subliminal symbol is detected in captured images of the application data displayed on the uncertified display device by extracting the symbol from the captured images and comparing the extracted symbol to an expected symbol;

determine that the application data is not corrupted when the extracted symbol matches the expected symbol;

identify a loss of ICA when the subliminal symbol is not detected in the application data displayed on the uncertified display device or does not match the expected symbol; and transmit an error indicator when a loss of ICA is identified.

* * * * *